July 14, 1964   MIGUEL FEU ALSO KNOWN AS   3,140,752
                MIGUEL FEU SERRAHIMA
                MOTORIZED SNOW VEHICLE
Filed April 7, 1961                        6 Sheets-Sheet 1

INVENTOR
Miguel Feu
also known as
Miguel Feu Serrahima
BY
ATTORNEY

July 14, 1964

MIGUEL FEU ALSO KNOWN AS
MIGUEL FEU SERRAHIMA
MOTORIZED SNOW VEHICLE 3,140,752

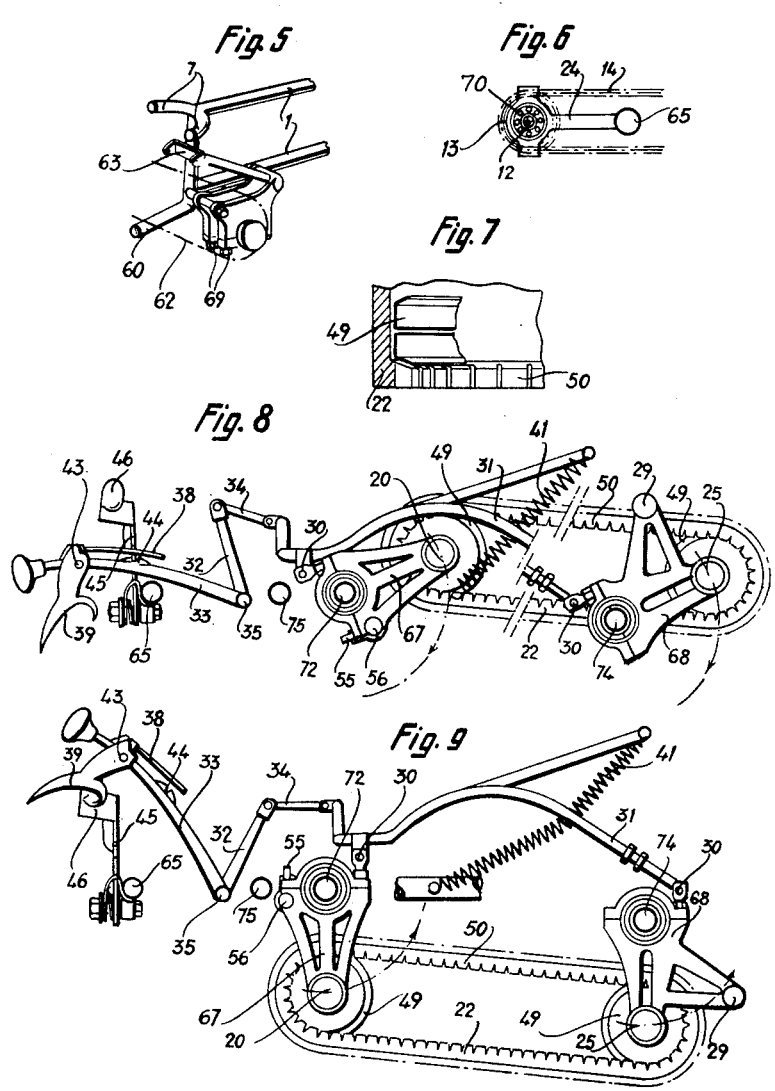

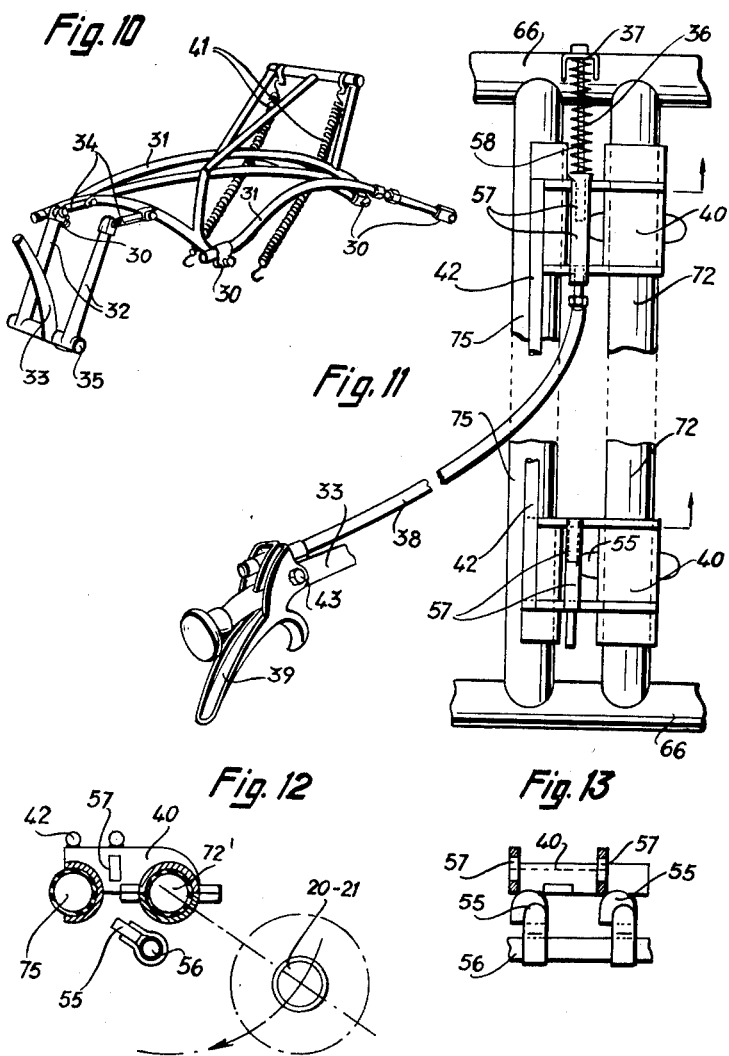

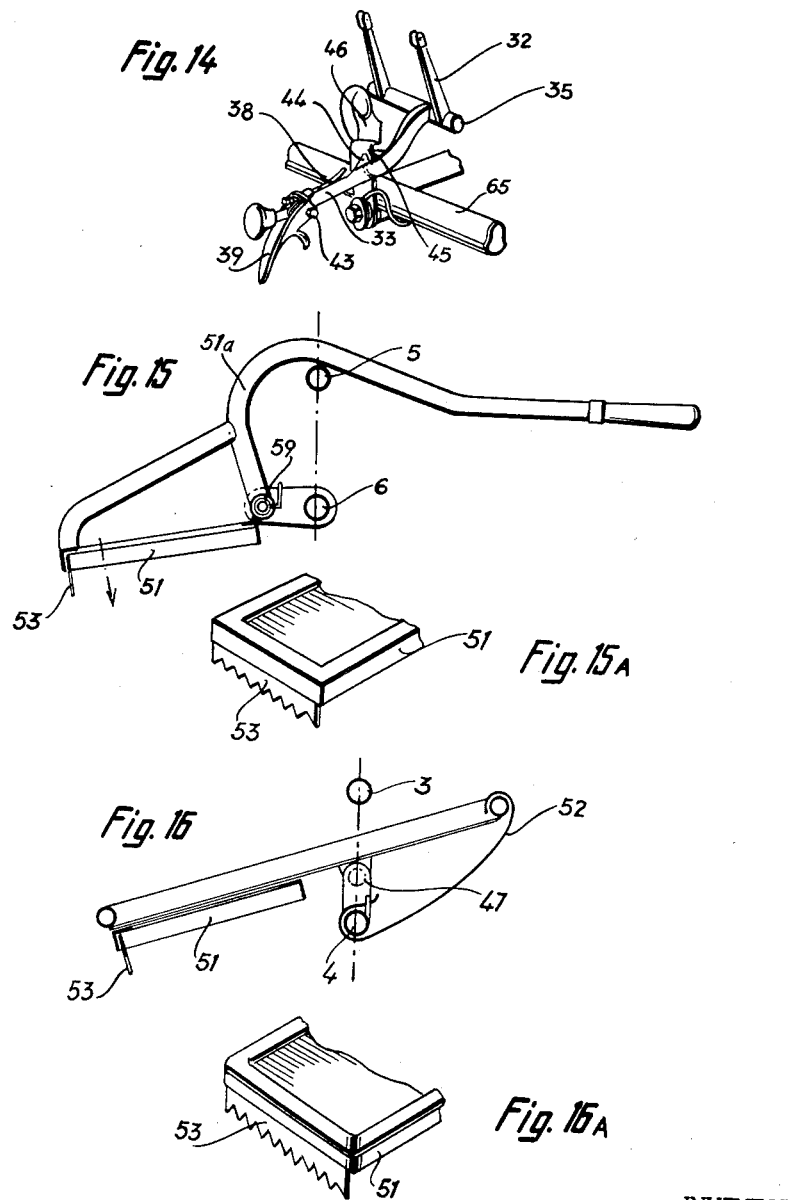

United States Patent Office 3,140,752
Patented July 14, 1964

3,140,752
MOTORIZED SNOW VEHICLE
Miguel Feu, also known as Miguel Feu Serrahima, Barcelona, Spain, assignor to L. Joseph F. Nagode, New York, N.Y.
Filed Apr. 7, 1961, Ser. No. 101,507
2 Claims. (Cl. 180—5)

The present invention relates to vehicles, and more particularly, to a motorized vehicle adapted for use in traveling over snow.

There is presently in use for transporting personnel and goods in snow, motorized vehicles, which utilize driven endless belts for movement similar to that of a military tank. These vehicles, however, are substantially heavy and are more suited for flat and only slightly rolling terrain.

The present invention provides a substantially small vehicle capable of accommodating one or two persons, or in lieu thereof, goods, which includes a drive motor assembly for a traction belt assembly, whereby crawling movement for use on flat terrain or slopes is available; and additionally, the vehicle is equipped with ski assemblies for use in descending slopes in snow. When descent by means of the ski assemblies is used, the drive motor is not used so that there is a considerable saving in fuel in practicing the invention. However, when the drive motor assembly is used for crawling movement, the rear ski assembly is raised with respect to the ground so that the front ski assembly and the crawler communicate with the ground.

As a result of the improvements of the invention there is provided a versatile vehicle suited for use on all kinds of terrain and particularly in snow which weighs approximately 100 kgs., has a payload of about 150 to 200 kgs., and which is powered by a small combustion engine, preferably gasoline, having small cubic dimensions of the order of 125 cm.$^3$ capable of ascending at a speed of between 3 and 20 kms. per hour.

The features of the invention will be forthcoming in greater detail from the detailed description given subsequently when taken in conjunction with the following drawings, wherein:

FIGURE 5 is a fragmentary view of the engine mounting structure of FIGURE 3, showing the mountings for certain bearings which are included in the power transmission connection from the engine to the traction belts.

FIGURE 6 is a fragmentary view showing bearings and a chain which are driven through a universal joint by the structure of FIGURE 5.

FIGURE 7 is a fragmentary plan view, partly in section, through an end portion of one of the traction belts.

FIGURE 8 is a diagrammatic elevational view of the mechanism for raising and lowering the traction belts with the belts in raised position.

FIGURE 9 is a view similar to FIG. 8 showing the traction belts lowered for engagement with the ground.

FIGURE 10 is a perspective view of the linkage mechanism embodied in FIGURES 8 and 9, the traction belts being omitted.

FIGURE 11 is a fragmentary plan view of the locking arrangement for the traction belt-raising and lowering mechanism of FIGURES 8 and 9.

FIGURE 12 is a fragmentary view in elevation, partly in longitudinal section, of a portion of FIGURE 11 taken transversely of the horizontal frame members upon which the locking mechanism is slidably mounted.

FIGURE 13 is a fragmentary diagrammatic view showing the locking members of FIGURE 11 released from locking engagement.

FIGURE 14 is a fragmentary perspective view of locking mechanism for the operating lever of the raising and lowering mechanism for the tractor belts.

FIGURE 15 is a diagrammatic elevational view of a rear hand brake.

Figure 1:
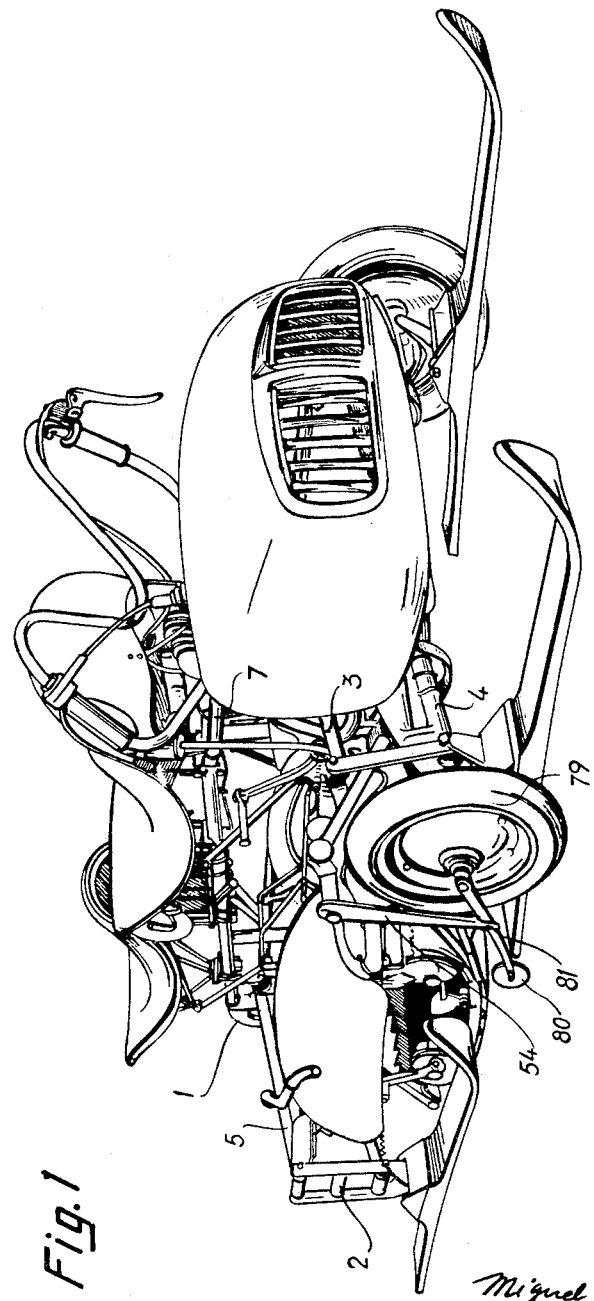
FIGURE 1 is a perspective view of a vehicle made in accordance with the invention.

FIGURE 15-A is a fragmentary perspective view of the brake member of FIGURE 15.

FIGURE 16 is a diagrammatic elevational view of a front foot brake.

FIGURE 16-A is a fragmentary perspective view of the brake member of FIGURE 16.

Referring to the drawing, the frame of the vehicle comprises a longitudinally extending U-shaped frame member 1. Skis 2 are secured to the frame member 1, the front skis being supported by outwardly extending upper arms 3 and lower arms 4. The rear skis are supported by outwardly extending upper arms 5 and lower arms 6.

Figure 4:
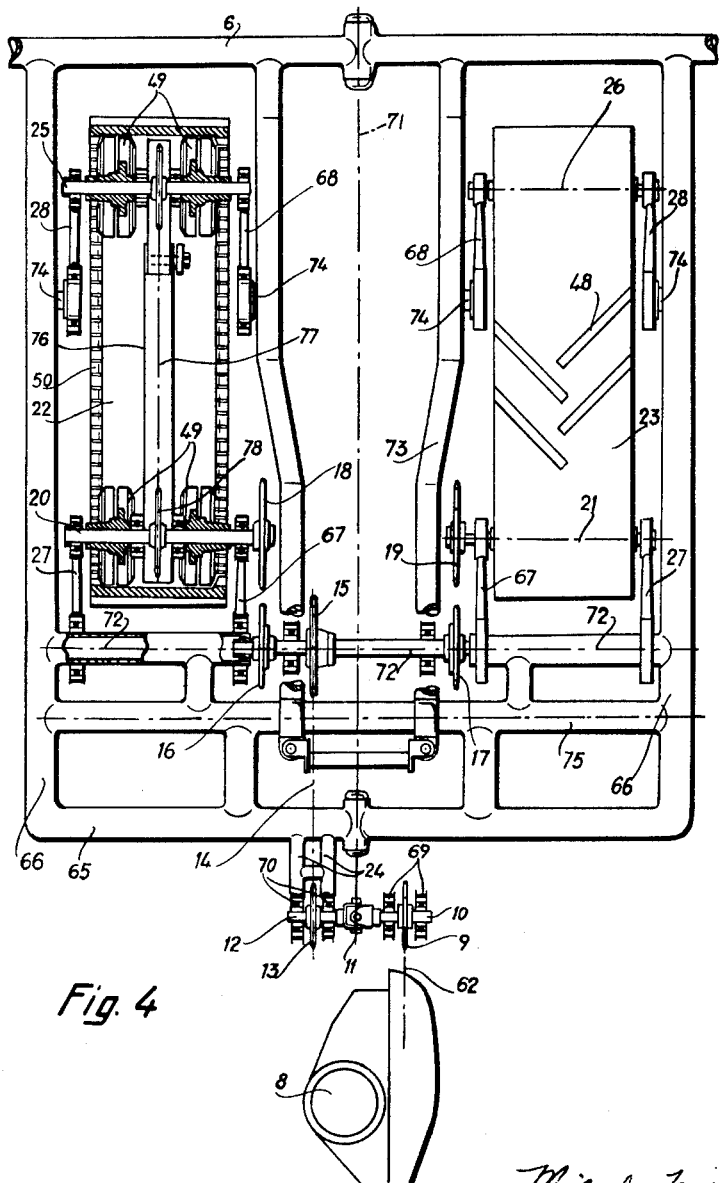
FIGURE 4 is a fragmentary plan view, partly in section, illustrating the driving connections to the traction belts.

A front frame member 7 extends around a gasoline engine 8. A pulley or sprocket wheel 9, driven from engine 8, is mounted on a shaft 10 (FIGURE 4). The shaft 10 is connected through a universal joint 11 to a shaft 12 which generally is axially aligned with the shaft 10. A sprocket wheel 13, fastened on shaft 12 is connected by a chain 14 to drive another sprocket wheel 15. The sprocket wheel 15, in turn, drives sprocket wheels 16 and 17. Sprocket wheels 16 and 17 are connected by chains (not shown) to drive further sprocket wheels 18 and 19 mounted on shafts 20 and 21, respectively.

A traction belt 22 is driven by shaft 20 and a similar traction belt 23 is driven by shaft 21. Forwardly extending arms 24 provide support for shaft 12. A rear shaft 25 is provided for traction belt 22 and a similar rear shaft 26 is provided for traction belt 23. The front shafts 20 and 21 are, in part, supported by outer arms 27. The rear shafts 25 and 26 are, in part, similarly supported by outer arms 28. A crossbar 29 (FIGURES 8 and 9) serves as a stop to limit upward movement of the traction belts 22 and 23.

Pivotally connected at 30 to inner belt supporting arms, later to be described, are arched connecting rods 31. Arms 32 (FIGURES 8 and 10) are rigidly connected for angular displacement by a manual operating lever 33. A separate link 34 connects each of the connecting rods 31 to the free outer end of one of the arms 32. The arms 32 and operating lever 33 are all fastened on a suitably journaled common shaft 35.

One end of a helical compression spring 36 bears against an upstanding lug 37. The spring 36 serves as a retractile spring, through the action of a Bowden wire 38, for a lock releasing lever 39 mounted near the free end of operating lever 33. The lock releasing lever 39 controls the lateral displacement of two lock members 40. Tension springs 41 (FIGURES 8, 9 and 10) counteract the weight of the traction belts 22 and 23. The two lock members 40 (FIGURE 11) are interconnected by a tie rod 42. The lock releasing lever 39 is mounted on the operating lever 33 by a pivot pin 43.

Projections on the operating lever 33 define a notch 44. When the traction belts are in their elevated position with the operating lever 33 depressed, a laterally projecting portion 45 of a locking lever 46 is received in the notch 44 and the operating lever 33 is thereby locked in its depressed position as shown in FIGURE 8.

A pivot pin 47 (FIGURE 16) disposed in a bracket mounted on one of the lower front ski arms 4 supports a foot operated brake, later to be described.

The traction belts 22 and 23 are mounted on drive wheels 49 (FIGURES 4, 7 and 8), four such wheels being provided for each belt. The front drive wheels for belt 22 are mounted on shaft 20 and the rear drive wheels on shaft 25. The corresponding wheels for belt 23, which are not visible in the drawing, are mounted on shafts 21 and 26, respectively. The outer face of each traction belt is provided with a continuous series of standard snow treads 48, shown in FIGURE 4 in conjunction with track 23. The edges of each traction belt are provided with inwardly projecting beads which are notched to form a series of blocks 50 (FIGURE 7). The blocks 50 provide lateral guidance for the traction belts 22 and 23 whereby they are constrained to remain in engagement with the drive wheels 49.

The foot pedal mounted on pivot pin 47 (FIGURE 16) carries a frame member 51. The foot pedal is urged in a clockwise direction as viewed in FIGURE 16 by a retractile spring 52. On the rear or trailing edge of the frame member 51 there is mounted a serrated scraping member 53 which exerts a braking action when pressed into engagement with snow or ice.

A depending link member 54 (FIGURE 1), is arranged to cause the raising or lowering of a ground wheel, later to be described.

Locking lugs 55 (FIGURES 11, 12 and 13) carried by a tubular tie rod 56, are arranged to engage in slots 57 formed in lock members 40 when the traction belts 22 and 23 are lowered for operation as shown in FIGURE 9. In FIGURE 13, the locking lugs are about to enter or have just left engagement with the slots 57. In cooperation with the cable 58 of Bowden wire 38, manual pressure on the lock releasing element 39 will urge lock members 40 leftwardly as viewed in FIGURE 13. The compression spring 36 (FIGURE 11) will yield to permit the locking lugs 55 to move upwardly, forcing the lock members 40 to the left, so that the locking lugs 55 may engage in the slots 57, thus locking the traction belts in their lowered position. The locking lugs 55 may be released from the slots 57 by operation of the lock releasing lever 39. The traction belts may then be raised by lowering the operating lever 33.

The rear hand brake shown in FIGURE 15 comprises a frame member 51 and scraping member 53 like the front foot operated brake of FIGURE 16. The rear brake lever 51a is carried by one of the lower rear ski supporting arms 6. A torsion spring 59 yieldingly urges the scraping member 53 upwardly.

Figure 2:
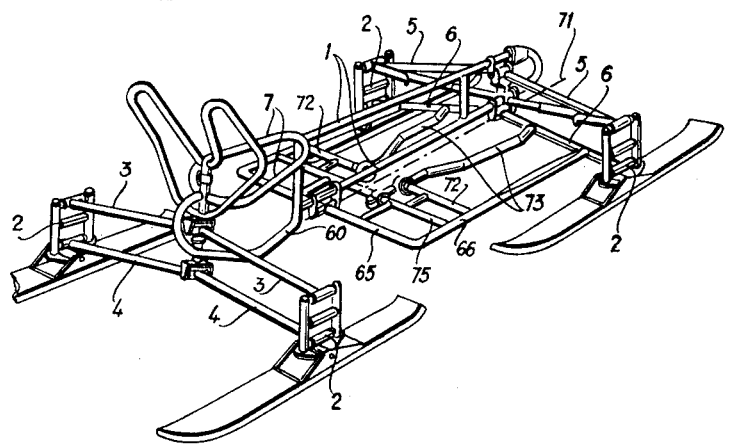
FIGURE 2 is a perspective view of the chassis of the vehicle shown in FIG. 1.
Figure 3:
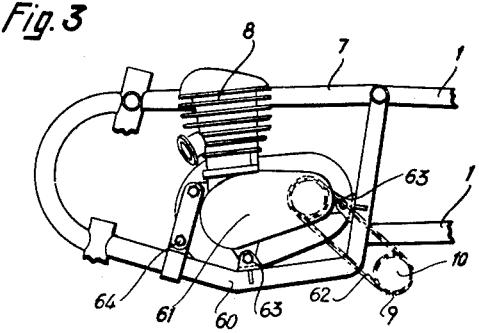
FIGURE 3 is a fragmentary view of the frame showing the mounting of the engine.

The motor 8 is mounted on a supporting frame member 60 (FIGURES 2 and 3) which is connected to frame member 7, and to the U-shaped frame member 1. The motor 8 is provided with speed reducing gearings enclosed in a housing 61. The motor 8 is drivingly connected to the sprocket or pulley 9 by the chain or belt 62. Two clamps 63 connect the motor 8 to the frame member 60. A further clamp 64 secures the forward portion of motor 8 to the frame member 60.

A front transverse frame member 65 interconnects the front ends of two longitudinally extending lateral frame members 66. The rear ends of the lateral frame members 66 are connected to the lower rear ski supporting arms 6. The bearings 69 (FIGURES 4 and 5) for shaft 10 are supported along with the engine 8 by the U-shaped frame member 1, and frame members 7 and 60. The bearings 70 for shaft 12 are supported by arms 24 which extend forwardly from the front transverse frame member 65. The front transverse frame member 65 together with the lateral frame members 66 and lower rear ski supporting arms 6 form a unit which is supported by the lower leg of U-shaped frame member 1 for pivotal movement about a longitudinal axis 71 which extends just below the U-shaped frame member 1 and intersects the universal joint 11. The rear skis, or traction belts, as the case may be, are thus movable upwardly and downwardly in opposite directions to accommodate ground irregularities. The universal joint 11 freely permits these pivotal movements of the unit comprising the frame members 65 and 66 and the rear ski arms 6 about the axis 71.

Shaft cross members 72 of the pivoted frame unit are connected at their inner ends to the front ends of inner longitudinal frame members 73. Laterally extending supporting studs 74 are fixed to the longitudinal frame members 66 and 73, and are provided with bearings to which the arms 28 and 68 are connected. The arched connecting rods 31 control movement of the arms 28 and 68, as described above. One rear traction belt shaft 25 is carried by the free end portions of one set of arms 28, 68 and the other rear traction belt shaft 26 is similarly carried by another set of arms 28, 68.

Front belt supporting arms 27 and 67 are journaled on the short cross members 72 and one set of arms 27, 67 carries the front belt shaft 20. Another set of arms 27, 67 carries the other front belt shaft 21 which is driven by sprocket 19.

A transverse frame member 75 extends between the lateral frame members 66 and is spaced ahead of the short frame members 72. The short frame members 72, near their inner ends, are connected to frame member 75 for support. A partially collapsible bracing member 76 holds shafts 20 and 25 in a relatively fixed spaced relation thus aiding members 28, 68 and 27, 67. The locking members 40, described above, are slidably mounted on the frame members 72 and 75.

A sprocket mounted on the rear shaft 25 is connected by a chain 77 to a sprocket 78 mounted on the front shaft 20 so that the front and rear shafts 20 and 25, respectively, rotate together at identical speeds. The front and rear shafts 21 and 26 are similarly interconnected.

Referring to FIGURE 1, a large road wheel 79 and a small wheel 80 journaled at opposite ends of a centrally pivoted arm 81 are connected to depending link member 54. Conventional means (not shown) are provided for raising and lowering the road wheels so that the vehicle may operate with all four skis raised above a road surface which has no snow or ice. As shown, the vehicle is provided with two motorcycle type seats located one behind the other on the U-shaped frame member 1.

While I have shown what I believe to be the best embodiment of my invention, it will be apparent that various modifications may be made therein without departing from the spirit and scope of the invention as defined in the appended claims.

I claim:

1. A snow vehicle comprising, in combination, an elongated main frame, at least one ski connected to support said main frame, an auxiliary frame pivotally connected to said main frame for displacement about an axis which extends parallel to the longitudinal axis of said main frame, said main frame being elongated in the direction of movement of said vehicle, two further skis connected to support said auxiliary frame, said last-named skis being symmetrically disposed with respect to said axis, two similar traction belt units carried by said auxiliary frame, said traction belt units being symmetrically arranged with respect to said axis, motor means connected to drive said traction belt units, and manually operable means for selectively vertically translating said belt units above said further skis or vertically translating said belt units below said further skis for driving engagement with a snow covered surface upon which said vehicle is to be propelled by said motor means, and wherein said motor means is carried by said main frame, said vehicle further comprising a universal joint through which said motor means is drivingly connected to said belt units, said universal joint having at least one vertical axis of pivoting and at least one horizontal axis of pivoting, said longitudinal axis intersecting said vertical axis and co-axially disposed with respect to said horizontal axis.

2. A vehicle according to claim 1, further comprising releasable locking means holding said belt units positioned either above or below said further skis.

References Cited in the file of this patent

UNITED STATES PATENTS

| | | |
|---|---|---|
| 1,916,375 | Knickerbocker | July 4, 1933 |
| 2,323,526 | Eliason | July 6, 1943 |
| 2,617,659 | Grenier | Nov. 11, 1952 |
| 2,970,662 | Hetteen | Feb. 7, 1961 |

FOREIGN PATENTS

| | | |
|---|---|---|
| 584,376 | Canada | Oct. 6, 1959 |